United States Patent Office 3,676,271
Patented July 11, 1972

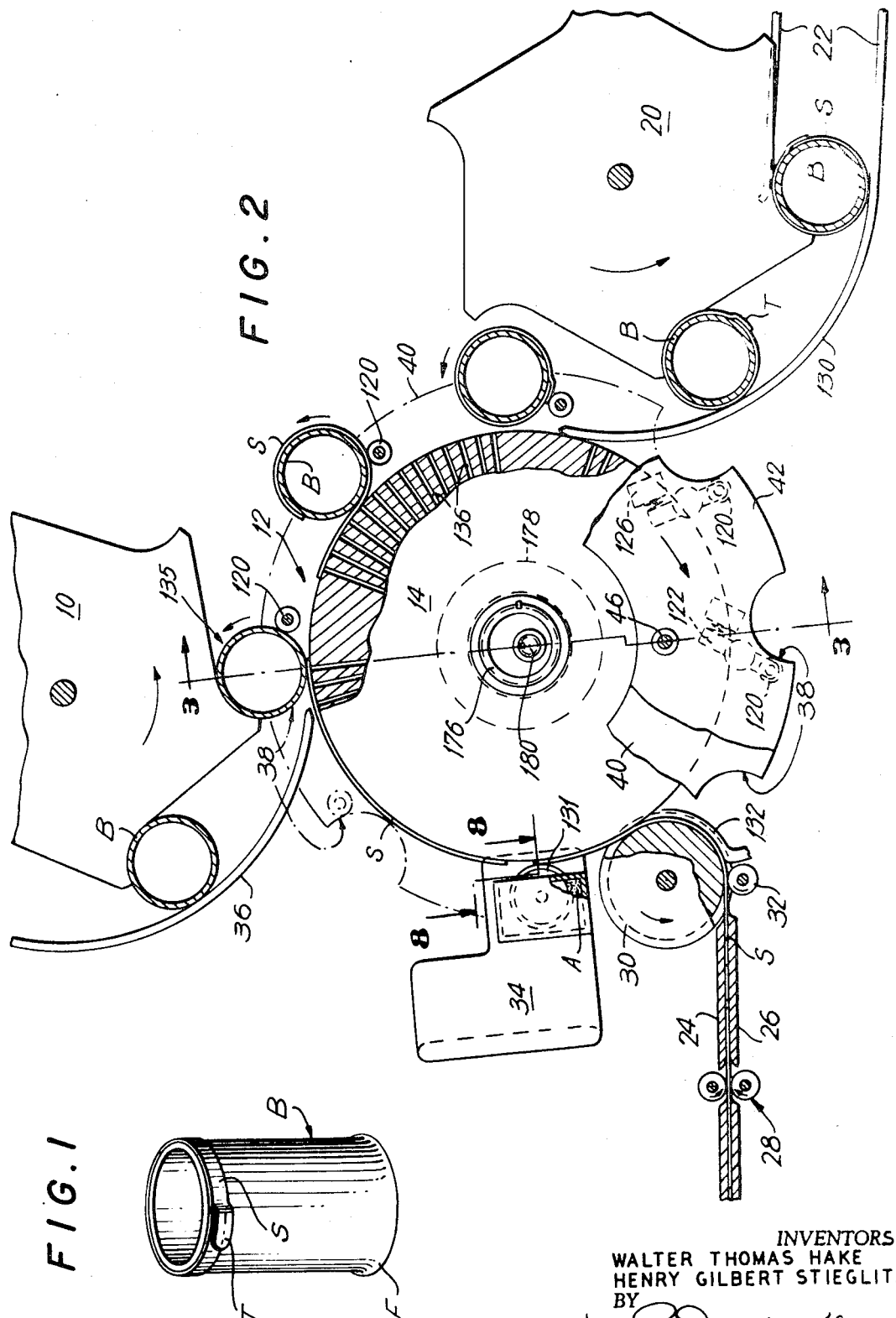

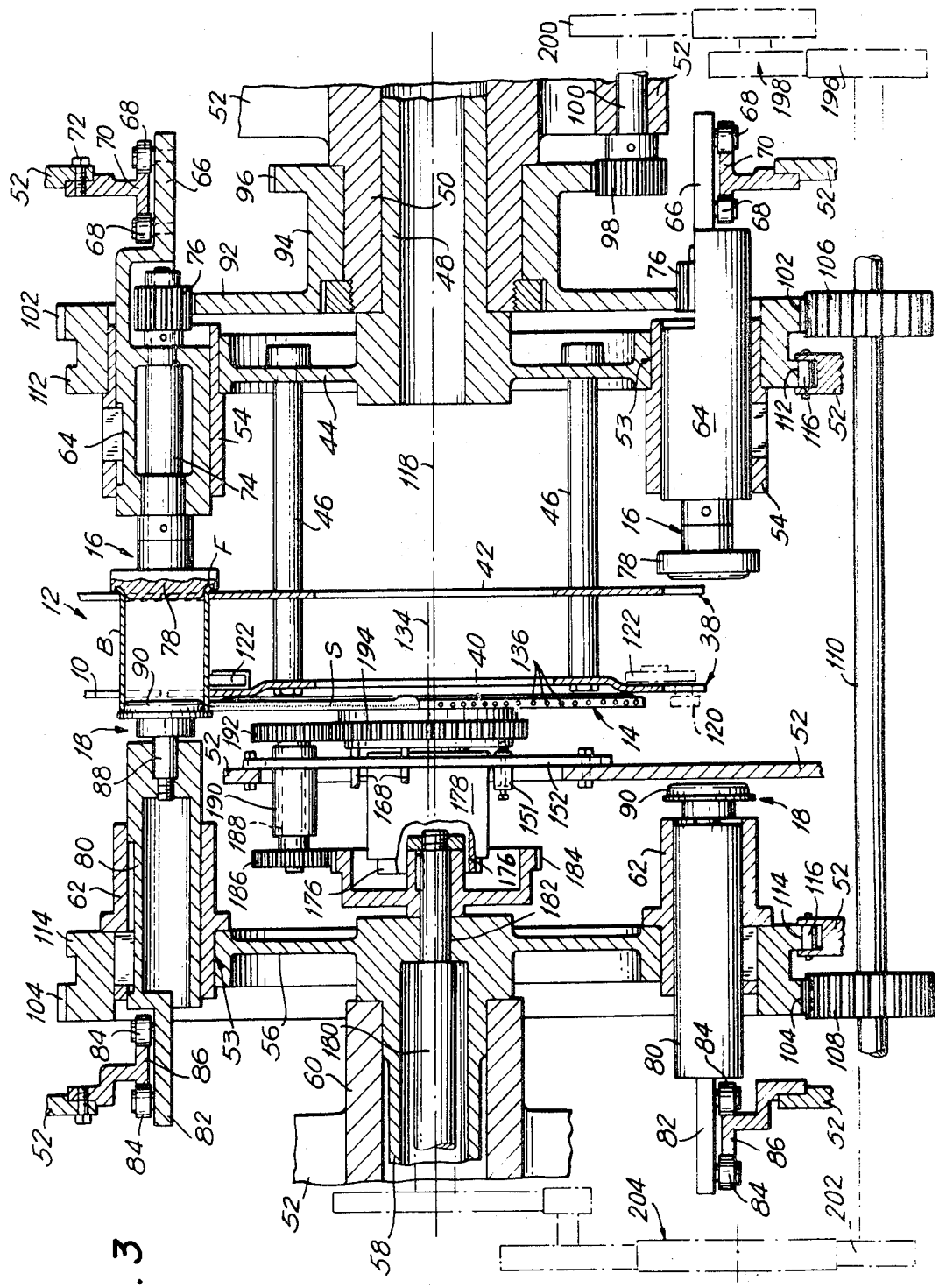

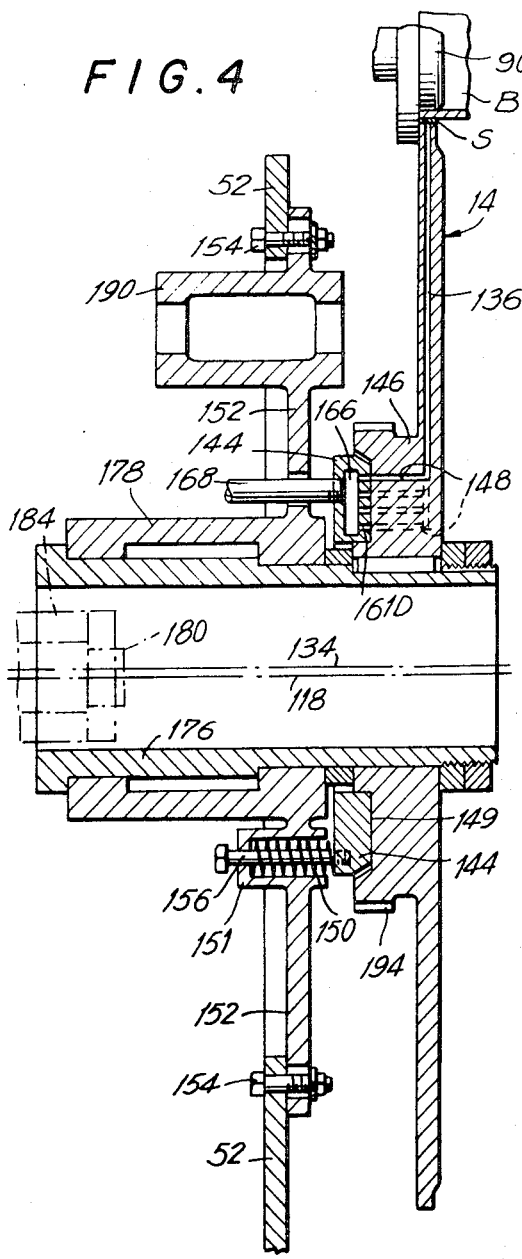
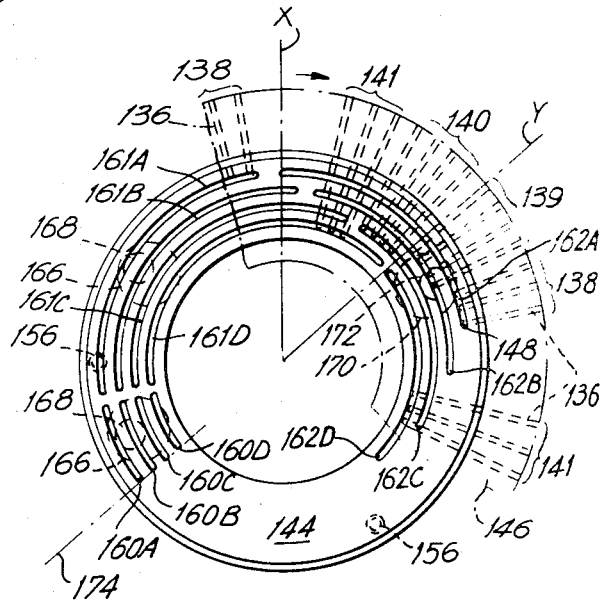
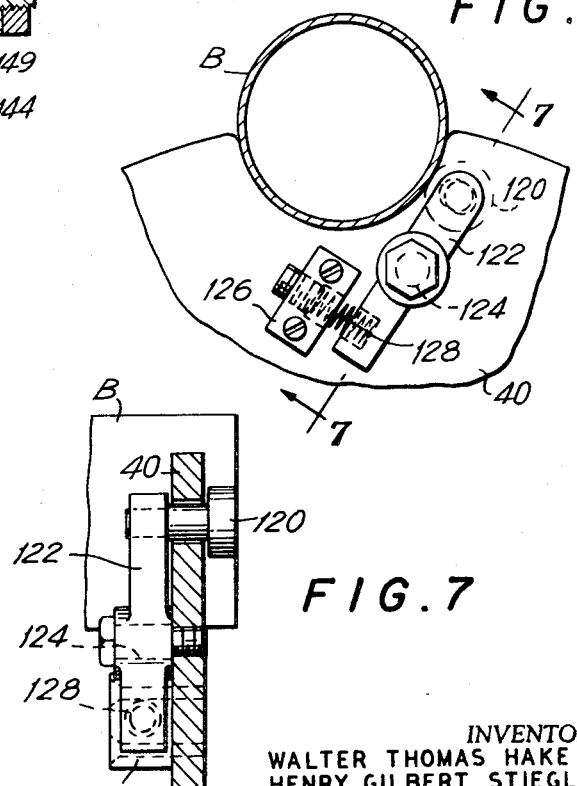
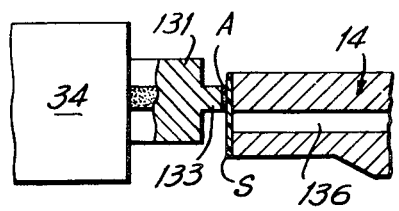

3,676,271
APPARATUS FOR APPLYING A STRIP MEMBER TO A CYLINDRICAL CONTAINER BODY
Walter Thomas Hake, Wyckoff, N.J., and Henry Gilbert Stieglitz, Cary, Ill., assignors to American Can Company, New York, N.Y.
Original application Oct. 23, 1967, Ser. No. 677,413, now Patent No. 3,524,006, dated Aug. 11, 1970. Divided and this application Mar. 25, 1970, Ser. No. 25,617
Int. Cl. B32b 31/10; B65b 61/18
U.S. Cl. 156—567
6 Claims

ABSTRACT OF THE DISCLOSURE

In applying to container bodies plastic seam release strips which are adapted to be stripped from the sealed container to provide an easy-opening feature, a rotating container body and a strip member are moved along substantially concentric, parallel paths to a location where the leading end of the strip member is brought into substantial tangential contact with the rotating body, whereupon the strip member is transferred to and wrapped around the rotating container body.

BACKGROUND OF THE INVENTION

This application is a division of co-pending application Ser. No. 677,413 filed Oct. 23, 1967.

Although the invention may be utilized in applying a strip or tape of any desired type to any suitable container-like body, it is particularly adaptable for applying to container bodies plastic seam release strips which are adapted to be stripped from the sealed containers to provide an easy-opening feature. In such containers, which are covered by U.S. Letters Patent 3,330,436, issued July 11, 1967 and entitled "Seam Release Container," a tubular container body, which may be of any suitable type as, for example, a spirally wound body comprising a plurality of fibreboard body plies and a label ply made of aluminum foil or a coated paper, has a pull-out or seam release strip applied to the outside wall surface of the body adjacent one end of the latter. The strip is positioned on the body so that an edge portion of the strip is adapted to be mechanically enclosed within the end seam securing the end closure or cover to the end of the container body which carries the strip. Thus, when a pull tab which is provided on the strip is manually grasped and pulled, the strip is peeled off the body and the strip edge within the end seam is withdrawn from the end seam to thereby loosen the securement of the end closure to the body for easy separation thereof.

The present invention relates to a method and apparatus for adhesively securing the seam release strip to the container body preparatory to the application of the end closure thereto. In the illustrated embodiment, container bodies are moved along an arcuate path of travel while simultaneously being rotated about their own axes. Seam release strips to be applied to the container bodies are carried along an arcuate path at a lineal speed which in general equals the lineal speed of the bodies plus the rotational speed of the bodies. The two arcuate paths are substantially concentric, that is, they may be either exactly concentric or slightly off center relative to one another, the arrangement being such that at least a portion of the path taken by the strips substantially parallels the arcuate path transcribed by the rotating bodies. The two arcuate paths are such that successive strips, which have previously had a tacky adhesive applied to them, are brought into substantial tangential contact with successive rotating container bodies at the point of initial parallelism of the paths whereby, upon contact, each body picks up a strip and the latter is wrapped around and adhesively secured to the body while the paths of both the body and the strip continue in parallelism so that the body and strip remain in close proximity to each other. During this time, the body moves backwardly relative to the strip so that although the latter is stripped off its carrier by the rotating body, it remains attached to and under the control of its carrier until this stripping operation is completed. Thus, the instant method facilitates provision of means on a strip carrier wheel to temporarily adhere the strip thereto and to maintain such adherence of the unwrapped trailing-end portion as the leading-end portion is being wrapped.

Control of the trailing-end portion of the strip is very desirable under certain operating conditions, particularly when wrapping long strips at high speeds since without such control, the trailing-end would tend to flap or otherwise follow an irregular path. Among other things, this latter situation could lead to uneven or uncontrolled tension in the unwrapped trailing end of the strip, resulting in an uneven wrap in which some sections might be wrapped tighter than others or in a wrap which goes askew. Also, depending on operating conditions, if uncontrolled, the trailing-end of the strip might be cut or otherwise damaged if allowed to flap uncontrollably. The aforesaid difficulties would, of course, be accentuated as longer strips and higher operating speeds are required. Since this invention is particularly adaptable for high-speed operation, it will be appreciated that the provision of positive control of the strip at all times, including control of the unwrapped trailing-end while the leading end is being wrapped, facilitates achievement of higher production rates. This invention, accordingly, has application in applying seam release strips or the like to container bodies at relatively high speeds commensurate with the economics of present-day mass-production practices.

SUMMARY OF THE INVENTION

In applying seam release strips to container bodies, the strips and the bodies are carried along substantially concentric paths at different speeds, each body being rotated about its own axis as it is moved along its path. A band of tacky adhesive is applied to the strip member as it is moved along its path. These operations are arranged and coordinated so that successive strips are brought into substantial tangential contact with successive rotating bodies whereby upon contact, each body picks up a strip member and the latter is wrapped around the body and pressed into intimate contact therewith so that it remains adhesively secured to the body when the latter is discharged from the machine. Because of the substantial coincidence of the paths of the bodies and strips, and the differences in their lineal speeds of travel, the strips remain under the control of the strip carrier until the wrapping operation is substantially completed.

BRIEF DESCRIPTION OF THE DRAWINGS

FIG. 1 is a perspective view of a tubular container body and a strip which has been applied thereto in accordance with this invention.

FIG. 2 is an elevation view, parts of which are broken away and in section and other parts of which are only partially shown, of a strip-applying apparatus showing the paths of the container bodies and of the strips which are applied thereto.

FIG. 3 is a sectional view taken substantially along the line 3—3 of FIG. 2.

FIG. 4 is a sectional detail on a larger scale, of the vacuum wheel and certain associated elements.

FIG. 5 is an elevational view of a face of the non-rotating element of the rotary control valve and a fragmentary portion of the vacuum wheel superimposed thereon.

FIG. 6 is a fragmentary sectional detail of the pressure roll assembly.

FIG. 7 is a sectional view of the pressure roll assembly taken substantially along the line 7—7 of FIG. 6.

FIG. 8 is a sectional detail of the adhesive applicator taken substantially along the line 8—8 of FIG. 2.

DESCRIPTION OF THE PREFERRED EMBODIMENTS

Referring to the drawings, FIGS. 2–8 disclose an apparatus for advancing tubular container bodies B and for feeding individual strips S and applying the latter to the container bodies. The bodies B are fed by suitable means (not shown) to a rotary feed turret 10. The feed turret 10 carries the bodies B to a position where they are transferred onto a carrier turret 12, the latter rotating adjacent a vacuum wheel 14 onto the periphery of which strips S have been applied. Spindles 16 and 18 (FIG. 3), adaptable to engage the ends of the bodies B and rotate the latter about their own axes, are mounted and are carried on the carrier turret 12, the arrangement being such that the rotating bodies are brought into contact with and pick the strips S off the vacuum wheel 14 and wrap them around their outer surfaces. Thereafter, the bodies B, each with a strip S wrapped therearound, are transferred to a discharge turret 20 and from there to discharge rails 22.

The plastic strips S, supplied at slightly spaced intervals from a suitable source (not shown), are fed by feed rollers 28 longitudinally through guide members 24, 26 (see FIG. 2) and thence to a hold-down roll 30 and a cooperating pinch roll 32 which feeds them to the vacuum wheel 14. As the strips are carried on the vacuum wheel 14, a suitable band of adhesive A is applied to the outside surface of the strips by an adhesive-applying apparatus 34. The strips S may be initially supplied to the feed rollers 28 by apparatus of any suitable type.

A perspective view of a finished container body B, to which the strip S having a pull tab T has been applied by the apparatus and method of the instant invention is shown in FIG. 1.

Turning to specific details of the illustrated embodiment and referring to FIG. 2, stationary guide rails 36 hold the container bodies B in the pockets of the rotating feed turret 10 until such bodies are transferred into one of the pockets 38 on the carrier turret 12 where one of the pairs of spindles 16, 18 engage the container body to rotate the latter. Each pair of spindles 16, 18 on the carrier turret is operable to rotate each container body to wrap a strip S thereon and also to form a flange F (FIG. 1) on one longitudinal end of the container body.

As shown in FIG. 3, the carrier turret 12 comprises a pair of longitudinally spaced support plates 40, 42 suitably secured to a laterally spaced wheel 44 by a plurality of elongated tie members 46. The wheel 44, in turn, is carried on a hollow shaft 48 journaled in a sleeve 50 which is affixed to the machine housing 52. The peripheries of the plates 40, 42 are suitably notched to provide the aforementioned body-receiving pockets 38 (eight in the illustrated embodiment) in the carrier turret 12. Another wheel 56 axially spaced from the first-mentioned wheel 44 is carried on a hollow shaft 58 journaled in a sleeve 60 which is also affixed to the machine housing 52. The two wheels 44 and 56 each have eight concentrically spaced openings 53 and these openings 53 in each wheel mount bushings 54 and 62 respectively. The bushings 54 and 62 are longitudinally aligned to form opposed pairs, each pair 54, 62 slidably mounting a respective spindle 16 and 18 which engages the ends of container bodies to rotate them on their axes as previously mentioned.

Each spindle 16 includes a slide member 64 slidably mounted in its respective bushing 54 and keyed therein against rotation. Each slide member 64 includes a tailpiece 66 which projects outwardly beyond the wheel 44 and which has mounted on it a pair of spaced rollers or cam followers 68. Each pair of cam followers 68 straddles a fixed annular cam 70 mounted on a web portion of the machine housing 52 by bolts 72. The surfaces of the cam 70 engaged by the followers 68 is so shaped that upon rotation of the carrier turret 12, the cam 70 engages the followers 68 to slide the slide members 64 axially back and forth within the bushings 54.

The slide members 64 each carry a spindle shaft 74 which is mounted for rotation relative to the slide member 64 on spaced bearings. At their outer ends, each spindle shaft 74 has fixed thereto a spindle gear 76 while at their inner ends, each has fixed thereto a flanging head 78 as will be further described.

As in the case of the spindles 16, each spindle 18 also has a slide member 80 slidably mounted in its respective bushing 62 and having a tailpiece 82 projecting outwardly beyond its associated wheel 56. As in the case of the prior description, each tailpiece 72 mounts a pair of spaced rollers or cam followers 84 straddling a fixed annular cam 86 mounted on a web of the machine housing 52, the surfaces of the cam 86 being engaged by the followers 84 to slide each member 80 axially back and forth in its respective bushings 62. Each slide member 80 carries a spindle shaft 88 which is mounted for free rotation relative to the slide member 80, the shaft 88 in turn mounting a support head 90 adapted to engage and support the end of container body B.

As a head 90 supports one end of a container body B, the axially aligned flanging head 78, which has a flanging surface, forms a flange F on the other end of the container body B, the flange F normally being formed at the end of the body which does not have a strip S applied to it. The reason for providing the flange F is to make it possible to secure the bottom end closure to the body B by means of a double seam, an example of such a seam being disclosed in U.S. Pat. No. 2,633,095. Since this type of seam is not usually desired at the top end of the container, the top of the body is not normally flanged. The flanging operation is conventional and, accordingly, will not be described in detail.

As a consequence of the above-described arrangement, the flanging heads 78 and the support heads 90 are axially slidable, by virtue of the shape of the cams 70 and 86, to insert the heads 78 and 90 into the open ends of the container bodies B as soon as possible after the bodies are received in the pocket 38 of the carrier turret 12 and to withdraw the heads from the open ends of the container bodies before the latter are transferred to the discharge turret 20.

The spindle gears 76 on the spindle shafts 74 mesh with and are driven by a spur gear 92, the latter having an elongated hub 94 concentric with the applicator turret shaft 48 and mounted for rotation on the outside of the sleeve 50 which, as previously mentioned, is fixed to the machine housing 52. The elongated hub 94 also has fixed thereto another spur gear 96 which in turn meshes with a spur gear 98 fixed to a shaft 100 mounted for rotation in a section of the machine housing 52.

The spindle gears 76 are of sufficient width so that they may be slid axially by the full throw of the cam 70 without coming out of mesh with the spindle drive gear 92. It will be observed that only the spindles 16 are power driven, each axially opposed spindle 18 being freely rotatable in its respective slide member 80.

Each carrier turret wheel 44 and 56 has fixed thereto a spur gear 102 and 104 respectively, the latter in turn meshing with drive gears 106 and 108 fixed to a common drive shaft 110. Each turret wheel 44 and 56 also has fixed thereto a support rim 112 and 114 respectively, adapted to be engaged by rollers 116 suitably mounted for free rotation on a section of the machine housing 52 and adapted to serve as a support for the carrier turret 12.

From the above description it will be apparent that rotation of drive shaft 110 will effect rotation of the carrier turret 12. It will be further apparent that as the carrier turret 12 revolves about the axis 118, pairs of spindles 16, 18 will be in axial alignment with the center line of each of the carrier turret body carrying pockets 38 to engage and rotate the container bodies B as the latter are carrier on the carrier turret 12 and thereafter to release the container bodies just before their transfer to the discharge turret 20.

As previously mentioned, each container body B, as it is carried on the carrier turret 12 and rotated by the spindles 16, 18, has a seam release strip S applied to it. To assist in the application of this strip S, a freely rotatable pressure roller 120 is mounted for releative pivotal movement on the carrier turret support plate 40 adjacent each body-receiving pocket 38 of the carrier turret and is adapted to roll the strip S into intimate contact with the body B as the strip S is lifted off of the vacuum wheel 14 by the rotating body B. The pressure rollers 120 preferably have an outer covering of resilient material (e.g. rubber) and are carried for relative rotating movement on crank arms 122, the latter being pivotally mounted on the carrier turret support plate 40 on pivot pins 124. The turret support plate 40 also has fixed thereto brackets 126 which support biasing means in the form of springs 128 which bias the crank arms 122 to urge the pressure rollers 120 towards the container body B. An adjustable stop (not shown) may be provided to position each roller 120 so that it is barely in substantial tangential contact with the container body B prior to the time the strip S is applied thereto. As the body B, rotated by the spindles 16, 18 lifts its strip S from the vacuum wheel, the roller 120 engages the strip S and slightly compresses the spring 128 whereby the roller 120 is rotated by such engagement and presses the strip S against the container body under spring pressure.

The spindle assemblies 16, 18 are driven (by means hereinafter described) at a suitable speed of rotation so that by the time a body B moves from a position where the strip S is initially engaged and picked up off the vacuum wheel 14, until the body with its applied strip S is transferred to the discharge turret 20, the container body is rotated through a sufficient number of turns (at least one) to insure that the full length of the strip S (including the pull tab T) is pressed against the body B. Suitable means, e.g. stripper rails 130 (FIG. 2), are provided to facilitate the transfer of the container bodies from the carrier turret 12 to the discharge turret 20 and from the latter to the discharge rails 22.

Having described the path of travel and the apparatus for handling the container bodies, a description of the strip feeding apparatus will now be set forth.

As previously mentioned, the strips S are supplied at slightly spaced intervals to the vacuum wheel 14 by the feed rollers 28 and the hold-down roll 30 and pinch roll 32. A guide member 132 (FIG. 2) having an arcuate surface slightly spaced from, but conforming to the curvature of, the hold-down roll 30 is provided to guide the strips S from between the hold-down roll 30 and pinch roll 32 onto the vacuum wheel 14. The hold-down roll 30 is tangentially disposed relative to the vacuum wheel 14 and thereby serves to press the strip S against the outer periphery of the vacuum wheel 14 when the strip initially contacts the vacuum wheel 14. As each strip S is carried on the vacuum wheel 14, the previously mentioned adhesive applicator mechanism 34 applies a band or strip of a suitable adhesive A (FIG. 8), which preferably is of a thermoplastic type having low-peel strength characteristics, to the strip. The adhesive applicator 34 may be of any suitable type and accordingly, is not described in great detail. The applicator mechanism 34 shown in the drawing herein includes an adhesive applying roll 131 which has a narrow annular peripheral extension or ring 133 which applies the molten thermoplastic adhesive band A along the full longitudinal length of the strip S, including the tab T and preferably in an area which is disposed adjacent that edge of the strip S which is to be farthest removed from the edge of the adjacent edge of the body B to which the strip S is applied.

As will be described in greater detail hereinafter, the vacuum wheel 14 is supported for rotation about an axis 134 which is substantially coincident with the axis of rotation 118 of the carrier turret 12, that is, the two axes 134, 118 may be concentric or slightly offset from one another. The illustrated embodiment shows the axes 134, 118 slightly offset, which is preferred under most circumstances, however, it will be understood that the invention also encompasses axes which are coincident as will be further described. The relative positions of the two axes 134 and 118, as shown in the drawings, are such that the vacuum wheel 14 will bring the leading end of the strip S into substantial tangential contact with one longitudinal end of the container body B at an area which may be termed a transfer station 135 (FIG. 2). This occurs at about the point where the vacuum wheel 14 and the body B, which has just been transferred from the feed turret 10 to the carrier turret 12, come into substantial tangency or, to put it one way, where the paths of travel of the strip S and the innermost surface of the body B come into tangency. Because of the tackiness of the band A (FIG. 8) of adhesive which has been applied to the outer surface of the strip by the adhesive-applying device 34, as previously described, the contacting portion of the strip S adheres immediately to the container body B and is lifted off of the vacuum wheel 14 by the rotating body B as the latter continues its circular path of movement on the carrier turret 12 toward the discharge turret 20. In order that the outer surface of the rotating container body B will be moving at substantially the same speed as the strip S as the latter is being carried on the vacuum wheel 14 at the time of transfer, the sum of the surface speed of revolution (i.e. its lineal speed) of each container body B around the carrier turret shafts 48, 58 and its surface speed of rotation about its own axis, should substantially equal the peripheral speed (i.e. lineal speed) of the vacuum wheel 14. It may, under some circumstances, be desirable to have the surface speed of the body B slightly exceed that of the vacuum wheel 14 in order to apply slight tension to the strip S. There is little danger of breaking the strip S when this is done since it may slide to some extent around the periphery of the wheel 14 despite the vacuum therein.

The vacuum wheel 14 has a plurality of radial passages 136 arranged into four essentially identical quadrants or sets (one such set shown in FIG. 5 comprising four groups of passages each identified by the numerals 138, 139, 140, 141). Each radial passage 136 opens to the outer peripheral surface of the vacuum wheel 14 thereby functioning to transmit a vacuum or pressure differential on said peripheral surface to adhere the strip thereon or to facilitate its release. Each such quadrant or set of passages 136 functions to hold a strip S on the vacuum wheel 14 from the time it is transferred thereto by the hold-down roll 30 until it is wrapped around the container body. It will be apparent that for each revolution of the vacuum wheel 14, four strips S are so transferred.

In order to control the vacuum and pressure in the radial passages 136, there is provided a rotary valve (FIG. 4) comprising a non-rotatable ring 144 mounted from the machine housing 52, as will be further described, and a mating, rotating ring 146 formed as a hub on one side of the vacuum wheel 14. The rotating ring 146 has formed in it a plurality of horizontal ports 148 each of which is in alignment with an inner radial end of a vacuum-wheel passage 136 and forms a continuation thereof, there being one connecting horizontal port 148 for each radial passage 136. Each horizontal port 148 opens up onto a face 149 of the rotating ring 146. The non-rotating ring 144, although fixed against rotation, is biased against the rotating ring face 149 to provide abutting and sliding contact therebetween. The biasing is effected by a plurality of springs 150 (only one shown). One end of each spring 150 rests against the end of a boss 151 on a bracket 152 fixed to the machine housing 52 by the bolts 154 and the other end of each spring 150 rests against the non-rotating ring 144. Each spring 150 is maintained in place by a stud 156 each of which has one end threaded to the non-rotating ring 144 and which is otherwise axially slidable in an opening in the end of the boss 151.

The non-rotating ring 144 is provided with two groups of concentric vacuum-grooves 160 and 161 (FIG. 5) and one group of concentric venting-grooves 162, there being four radially spaced grooves to each group, the outermost radial grooves in each case being identified by the suffix A and, progressing radially inwardly, by the suffixes B, C, and D. It will be observed that although all the concentric vacuum grooves in group 160 are of the same length in terms of degrees of arc, the concentric vacuum grooves in group 161 are of different lengths, the inner radial ones being longer. Thus, considering a clockwise rotational orientation, all the starting ends of the circumferential vacuum grooves in group 161 begin on the same imaginary radius line, but they end in staggered, circumferential array. Both ends of each of the four venting grooves 162A, 162B, 162C, 162D are also staggered circumferentially, but, unlike the vacuum grooves in group 161, these four venting grooves are of substantially the same circumferential length. It will be observed that the concentrically staggered leading ends of each venting groove 162A, 162B, 162C, 162D is slightly spaced (circumferentially) from the concentrically staggered trailing end of each vacuum groove 161A, 161B, 161C, 161D, respectively.

There is provided in the non-rotating ring 144 two vacuum ports 166, one for each vacuum groove group 160 and 161. Each port 166 is open to all four concentric grooves in the particular vacuum-groove group 160 or 161 and each, in turn, communicates with a pipe 168, see FIG. 4 for example, leading to a vacuum source. In a somewhat similar arrangement, the venting grooves in group 162 communicate with the external atmosphere via the venting port 170 and pipe 172 (FIG. 5). If desired, the pipe 172 may be connected to a source of positive air pressure to positively break the vacuum in the radial venting passages 136 and thus facilitate release and removal of the strips S from the vacuum wheel 14.

It will be seen in FIG. 5 that the horizontal ports 148 leading to the radial passages 136 are arranged in groups, (one group for each group of radial passages 138, 139, 140, 141) and such groups of horizontal ports 148 are arranged in staggered array (i.e. they are staggered in a radial direction) so that, considering a clockwise rotational orientation, the leading group 138 of radial passages 136 in the quadrant illustrated in FIG. 5 lead to a group of horizontal ports 148 which are aligned and which are adapted to communicate with the outer concentric grooves (A). In a similar arrangement, it will be apparent in FIG. 5 that the next group 139 of radial passages 136 are adapted to communicate with concentric grooves (B), radial passages in group 140 with grooves (C) and radial passages in group 141 with group (D). Consequently, as the vacuum wheel 14 is rotated clockwise and passes a fixed position (e.g. the imaginary radial line 174 in FIG. 5), vacuum will be applied progressively to the four groups of radial passages 138, 139, 140, 141, in that order, as each respective group reaches the fixed position 174. This initial application of vacuum may be a few degrees prior to where strip S is placed against the outer peripheral surface of the vacuum wheel 14 by the hold-down roll 30 and is continued, as determined by the length of the vacuum grooves, until just prior to the time the strip is to be wrapped on the container body.

Each concentric vacuum groove in group 160 is circumferentially spaced and thereby separated from its corresponding concentric vacuum groove in group 161. Accordingly, any reduction or loss of vacuum in the vacuum grooves of group 160 will not be transmitted to the vacuum grooves in group 161. Thus, when the vacuum is initially applied to a radial passage 136 at position 174 just before said passage is about to have its open end covered by a strip, as aforesaid, any momentary reduction in vacuum resulting from venting of any of the vacuum grooves in group 160 through such uncovered radial passage 136 will not be transmitted to the separated vacuum grooves in group 161. Although not shown in the drawings, the group of vacuum grooves 161 may similarily be divided into two separate sub-groups, each having a separate vacuum port 166 and transmission pipe 168. Separating the vacuum grooves in this manner, therefore, not only isolates vacuum reduction and losses caused by any uncovered ports at the beginning of the strip transfer to the vacuum wheel but also at the end thereof when the trailing end of the strip is removed from the vacuum wheel and wrapped around the body.

The point at which the strip is released from the vacuum wheel 14 for transfer to the body advances progressively along the vacuum wheel 14. Thus, the leading end of the strip S is released at radial line X (defined by the leading end of venting groove 162A (see FIG. 5), and the trailing end portion of the strip is released at radial line Y (defined by the leading end of venting groove 162D), intermediate portions of the strip, of course, being released at intermediate points between X and Y as defined by the leading ends of venting grooves 162B and 162C. Expressed otherwise, the leading end of the strip is released from the vacuum wheel at location X at the start of the wrap and the location of release advances along the vacuum wheel from X until the trailing end of the strip is released at location Y at the end of the wrapping operation.

From the above description, it will be apparent that the vacuum wheel 14 is operable to hold the progressively shorter trailing end portion of each strip on the vacuum wheel until such time as the strip is completely wrapped around a container body.

As previously mentioned, the illustrated embodiment shows the axes 134 and 118 of the vacuum wheel 14 and carrier turret 12 respectively, slightly offset from one another. To effect this offset disposition, a hollow shaft 176 on which the vacuum wheel 14 is fixed is mounted for relative rotation within a bearing element or bushing 178 fixed to the previously described bracket 152. It will be apparent in FIG. 4 that the position of the bracket 152 relative to the machine housing 52 may be adjusted to change the position of the vacuum wheel shaft 176 relative to the machine housing 52, the adjustment being effected by loosening the bolts 154 and positioning the bracket 152 relative to the machine housing 52 to the desired position and then tightening the bolts 154 once again. It will be evident that changing the position of the shaft 176 relative to the machine housing 52 changes the position of the vacuum wheel 14 relative to the carrier turret 12, the latter being mounted for rotation in the sleeves 50 and 60 (FIG. 3) fixed to the machine housing 52 as previously described.

The drive for the vacuum wheel 14 is obtained from a shaft 180 (FIG. 3) extending through the previously described hollow shaft 58 and mounted for relative rotary movement within said hollow shaft 58 at 182. The shaft 180 has fixed thereto a gear 184 which meshes with another gear 186 affixed to a shaft 188, the latter in turn, being mounted for rotation in a bearing support element 190 fixed to the previously described bracket 152. The shaft 188 has fixed thereto another gear 192 meshing with a gear 194 fixed to the vacuum wheel 14. Thus, it will be apparent in FIG. 3 that the shaft 180 is operable to drive the vacuum wheel 14 through the illustrated gear train.

When adjusting the position of the vacuum wheel 14 relative to the carrier turret 12, as previously described, there will be relative displacement between the gears 184 and 186. In most instances, the amount will not be significant enough to produce intolerable misalignment in the meshing thereof or to require changing to different size gears. The gears 184 and 186 instead of meshing at the top of gear 186, as shown, may be arranged to mesh ninety degrees therefrom (i.e. at the side of gear 186) so that vertical adjustment of gear 186 will have less affect on gear misalignment.

With the slightly offset axes 118, 134, there is a single transverse line of tangency between the outer surface of a strip carried on the vacuum wheel 14 and the outer surface of a container body carried on the carrier turret, this single line of tangency occurring at the transfer station 135. At all other points thereafter, the arcuate paths of travel of the bodies and strips diverge slightly, but the divergence is so slight as to be immaterial to the efficient functioning of the apparatus.

The machine elements are readily adjustable to provide this line of tangency by changing the position of the vacuum wheel 14 relative to the carrier turret 12 as aforesaid. By means of this adjustment, it is possible to readily adapt the apparatus for handling different size container bodies and different length strips. For example, if it is desired to apply a shorter strip to a smaller diameter body, it is possible to use the same vacuum wheel 14 and carrier turret 12, although on the latter, the heads 78 and 90 on the spindles 16 and 18 respectively, would have to be changed to accommodate the smaller diameter container body B. Also, the position of the vacuum wheel 14 would have to be adjusted, as previously described, to effect tangency between the upper surface of the leading end of one of the strips and the outer surface of the container body at the transfer station 135. Since the strips are shorter, the radial passages 136 at the beginning or end of each quadrant or set of radial passages may be obturated with plugs. Larger diameter container bodies may be accommodated by making corresponding adjustments as required. As prevously indicated, the vacuum wheel axis 134 may be arranged coincident with the carrier turret axis 118, this position of the vacuum wheel 14 being determinative of the largest diameter body B which can be accommodated by a particular size apparatus.

It will be understood that other adjustments will be made upon changing the position of the vacuum wheel 14 relative to the carrier turret 12. For example, provision may be made to adjust the position of adhesive applying apparatus 34, to adjust the position of the hold-down roll 30, to adjust the position of the shoe 132, and to adjust the tension in the springs 128 on the hold-down mechanism.

The drive for the various elements is synchronized through a common drive. As illustrated schematically in broken lines in FIG. 3, this may comprise the aforementioned drive shaft 110 having gears 106 and 108 adapted to mesh with the gears 102 and 104 of the carrier turret 14 to drive the latter, another gear 196 to drive the spindles 16 via intermediate gears 198 and 200, the latter being fixed to the previously described spindle drive shaft 100, and a gear 202 to drive the vacuum wheel drive shaft 180 through a gear train indicated generally at 204. It will be apparent that with this arrangement, the operation of the various operating elements may be readily synchronized. It will also be apparent when there is no desire to adapt the machine to changes in body diameter, the axes 134 and 118 may be common to each other, and the paths of travel of the strips and bodies may in such event be truly concentric without disadvantage to the operation of the apparatus.

It is thought that the invention and many of its attendant advantages will be understood from the foregoing description and it will be apparent that various changes may be made in the form, construction and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. Apparatus for applying strips to container bodies or the like, comprising:
    carrying means for successively carrying a plurality of container bodies along a circular path of travel;
    rotating means for rotating said bodies about their own axes as said bodies are carried along said path;
    means for feeding strips along a circular path to a location which brings successive strips into contact with the outer periphery of successive, rotating container bodies, said strip feeding means comprising a feed wheel carrying strips on a peripheral surface thereof, said feed wheel having an axis of rotation within the container body circular path of travel and slightly offset relative to the axis of the container body circular path of travel; and
    operable means maintaining the trailing end of each strip in its path as the leading end is wrapped around a container body.

2. Apparatus for applying strips according to claim 1 further comprising means for adjusting the relative position between the strip feed wheel and the carrying means for the container bodies.

3. Apparatus for applying strips according to claim 1 further comprising
    a housing,
    and wherein
    said feed wheel is mounted for rotation on said housing, and
    a plurality of radial passages are formed in said feed wheel which open onto the peripheral surface of the feed wheel, and further wherein
    said operable means comprises a source of fluid presure, and a rotary valve having
        a non-rotatable member mounted on said housing,
        a plurality of concentric grooves formed in said non-rotatable member, and in communication with said source of fluid pressure,
        a rotatable member carried by said feed wheel, and
        a set of ports formed in said rotatable member, each of said ports communicating with a radial passage of said feed wheel,
    said plurality of concentric grooves of said non-rotatable member adapted to establish communication with said ports of said rotatable member whereby the fluid pressure in said grooves may be transmitted to said ports and radial passages.

4. Apparatus for applying strips according to claim 3 wherein said plurality of concentric grooves comprises vacuum grooves and venting grooves, the terminating ends of said vacuum grooves and the starting ends of said venting grooves being arranged in staggered, circumferential array.

5. Apparatus for applying strips according to claim 4 wherein said set of ports are arranged in concentric groups, each group being radially spaced from one another, and there is a separate vacuum and venting groove for each said group whereby each group of ports is exposed to vacuum followed by venting.

6. Apparatus for applying strips according to claim 5 wherein the leading group of ports in said set, considering a rotational orientation for the rotatable member, is aligned with the venting groove which has its starting end located in advance of the starting ends of the other venting grooves, and the trailing group of ports in said set is aligned with the venting groove which has its starting end located past the starting ends of the other venting grooves, whereby the leading group of ports and the trailing group of ports are vented at circumferentially spaced locations.

References Cited

UNITED STATES PATENTS

| | | | |
|---|---|---|---|
| 3,555,764 | 1/1971 | Dowling | 53—139.3 |
| 3,091,808 | 6/1963 | Dakin | 226—95 X |
| 3,404,059 | 10/1968 | Ritterhoff | 156—456 X |
| 3,562,050 | 2/1971 | Hake et al. | 156—447 X |

BENJAMIN A. BORCHELT, Primary Examiner

J. M. HANLEY, Assistant Examiner

U.S. Cl. X.R.

53—139.3; 156—456, 552